United States Patent [19]

Hawrylak

[11] Patent Number: 5,190,113
[45] Date of Patent: Mar. 2, 1993

[54] REAMER

[76] Inventor: Mike Hawrylak, General Delivery, Corey, Alberta, Canada, T0A 2E0

[21] Appl. No.: 746,898
[22] Filed: Aug. 19, 1991

[30] Foreign Application Priority Data

Nov. 13, 1990 [CA] Canada ............................ 2029733

[51] Int. Cl.⁵ ........................ E21B 10/32; E21B 17/07
[52] U.S. Cl. .......................................... 175/18; 299/24
[58] Field of Search .................. 175/18, 53, 265, 285, 175/286, 321, 323, 384, 386; 299/24

[56] References Cited

U.S. PATENT DOCUMENTS 3,749,184  7/1973  Andeen .................................. 175/18
4,819,744  4/1989  Caswell ................................. 175/18

Primary Examiner—William P. Neuder
Attorney, Agent, or Firm—Beveridge, DeGrandi, Weilacher & Young

[57] ABSTRACT

A reamer consisting of an elongate body having a first end and a second end. At least one blade is secured to the first end of the elongate body. The blade is movable between an extended position wherein the blade extends radially at an angle from the elongate body and a retracted position wherein the blade is drawn in toward the elongate body. A handle is provided at the second end of the elongate body. The elongate body is inserted through a hole with the blade in the retracted position and then manually rotated to ream a remove end of the hole with the blade in the extended position. A lever is provided adjacent the handle at the second end of the elongate body for moving the blade between the extended position and the retracted position.

2 Claims, 4 Drawing Sheets

REAMER

The present invention relates to a reamer.

BACKGROUND OF THE INVENTION

Reamers are tools that are used to enlarge or taper holes. Such tools are well known in diverse arts; however, to the applicant's knowledge, no reamers exist that are especially adapted for reaming ice when ice fishing.

In order to ice fish a hole is cut with an auger through the ice of a frozen lake. A fishing line is then dropped through the hole in the ice. A problem often experienced when ice fishing is the accidental severing of the fishing line by sharp circumferential ridges of ice at the bottom of the hole.

SUMMARY OF THE INVENTION

What is required is a reamer which can ream the sharp circumferential ridges of ice at the bottom of an ice fishing hole.

According to the present invention there is provided a reamer, which is comprised of an elongate body having a first end and a second end. At least one blade is secured to the first end of the elongate body. The blade is movable between an extended position wherein the blade extends radially at an angle from the elongate body and a retracted position wherein the blade is drawn in toward the elongate body. Means are provided at the second end of the elongate body whereby the elongate body is inserted through a hole with the blade in the retracted position and then rotated to ream a remove end of the hole with the blade in the extended position. Means are provided at the second end of the elongate body for moving the blade between the extended position and the retracted position.

The reamer as described was developed for ice fishing. Unlike other applications, the remote end of the hole is not accessible for reaming. The present invention permits the elongate body to be inserted in the hole with the blade in a retracted position. Once the blade is through the hole it can then be placed in an extended position by manipulating an activating lever at the second end of the elongate body. In the extended position the blade extends radially outward at an angle. By manipulating the handle the elongate body can be rotated to ream the remote end of the hole. The blade can then be moved back into the retracted position to permit the elongate body to be withdrawn from the hole.

Although beneficial results may be obtained through the use of the reamer as described, when ice fishing on a remote frozen lake it is an advantage to have as few pieces of equipment as possible. The Applicant discovered that every time he went ice fishing he had to carry both an ice auger and the ice reamer. Even more beneficial results can therefore be obtained where the elongate body has a spiral cutting edge such that the elongate body functions as an auger.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENT

Figure 1:
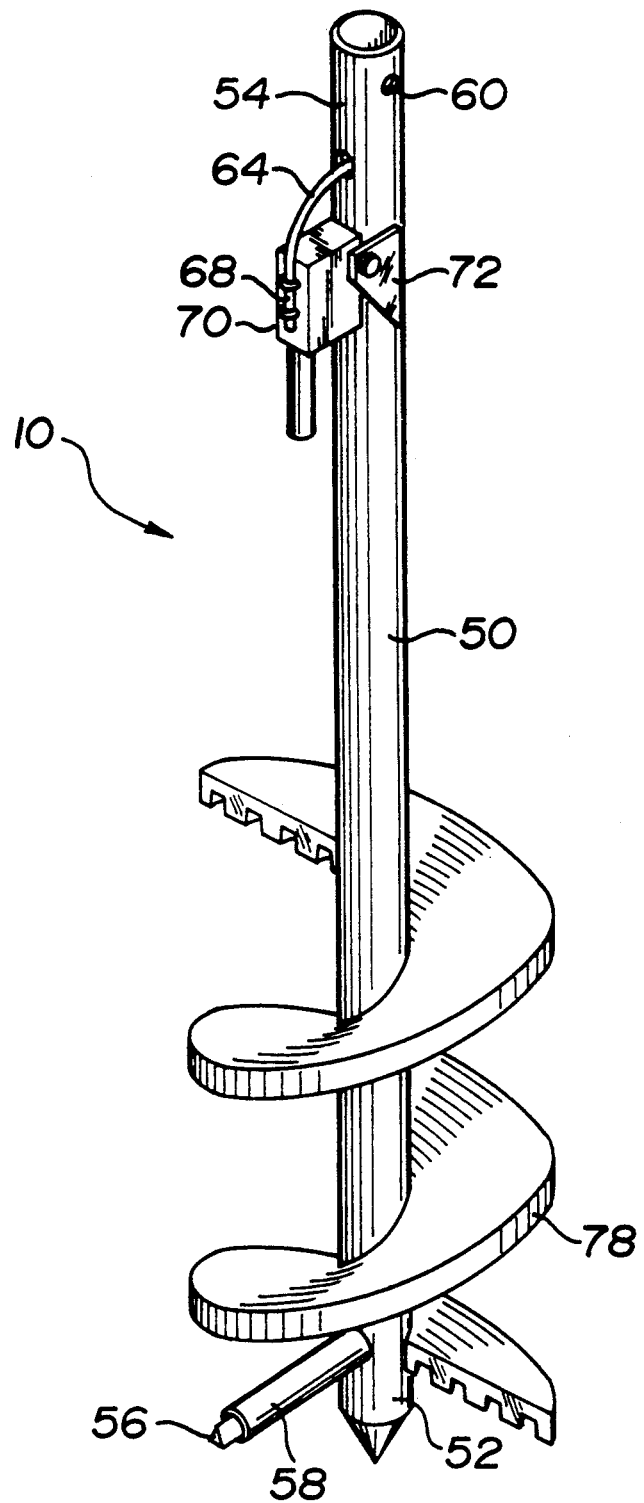
FIG. 1 is a perspective view of a reamer constructed in accordance with the teachings of the invention.
Figure 2:
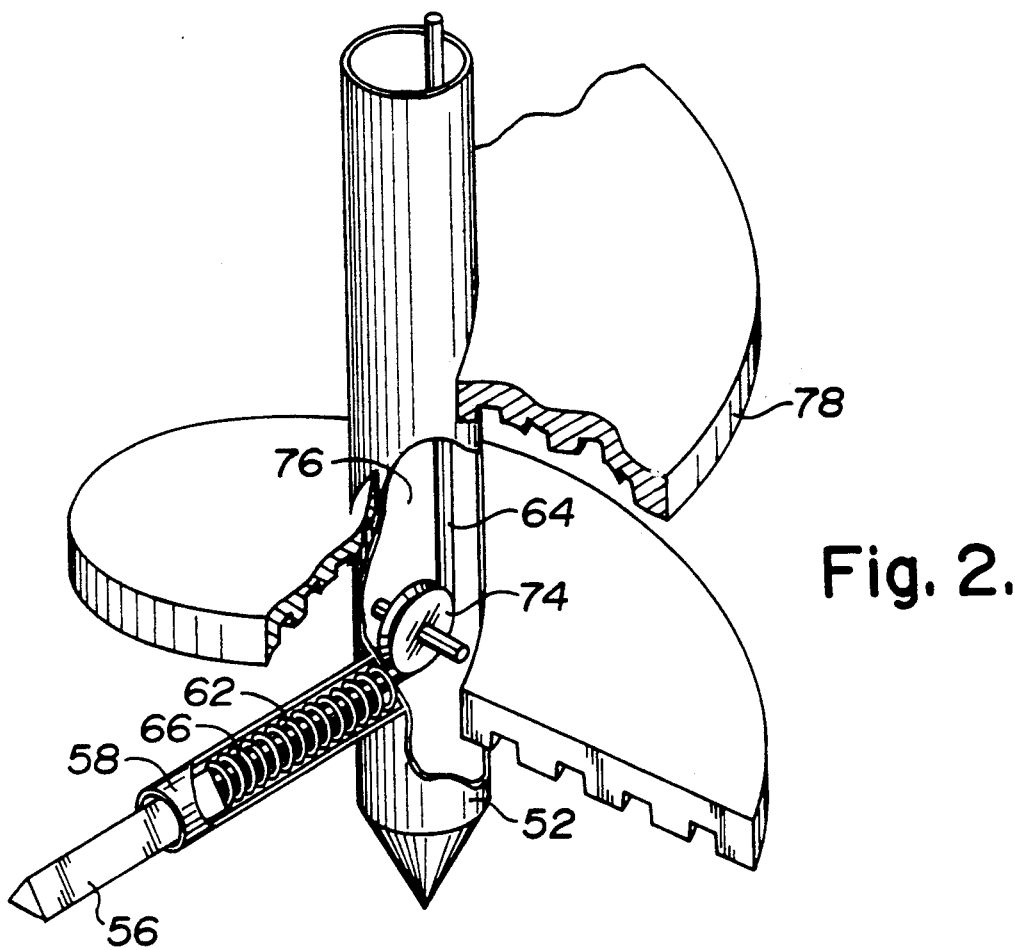
FIG. 2 is a partially cut away perspective view of a first end of the reamer illustrated in FIG. 1.
Figure 3:
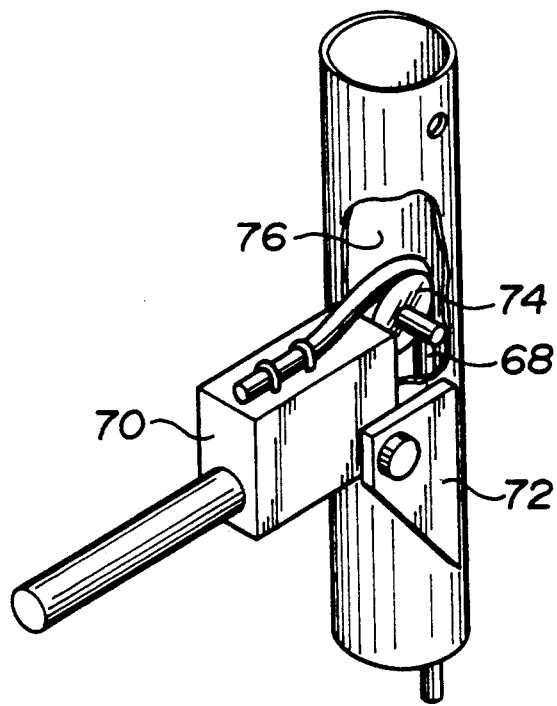
FIG. 3 is a partially cut away perspective view of a second end of the reamer illustrated in FIG. 1.
Figure 4:
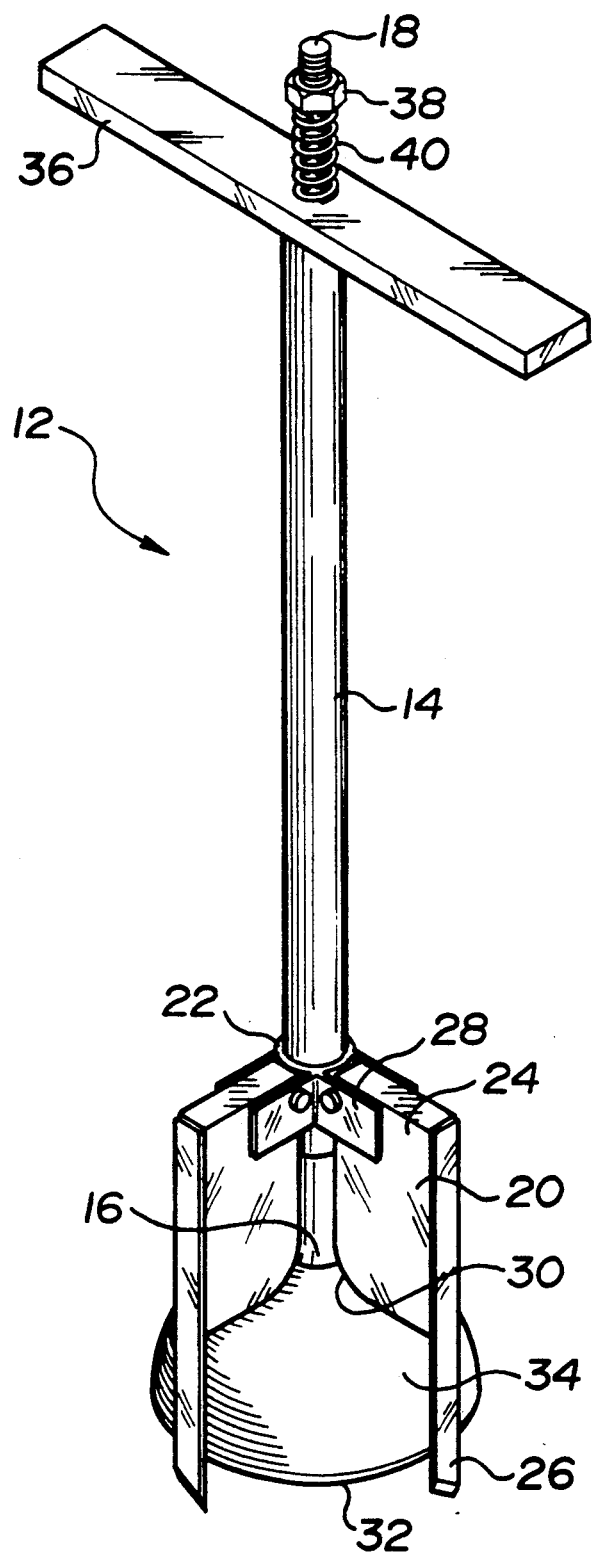
FIG. 4 is a perspective view of an alternate embodiment of an ice reamer constructed in accordance with the teachings of the invention, with blades in a retracted position.
Figure 5:
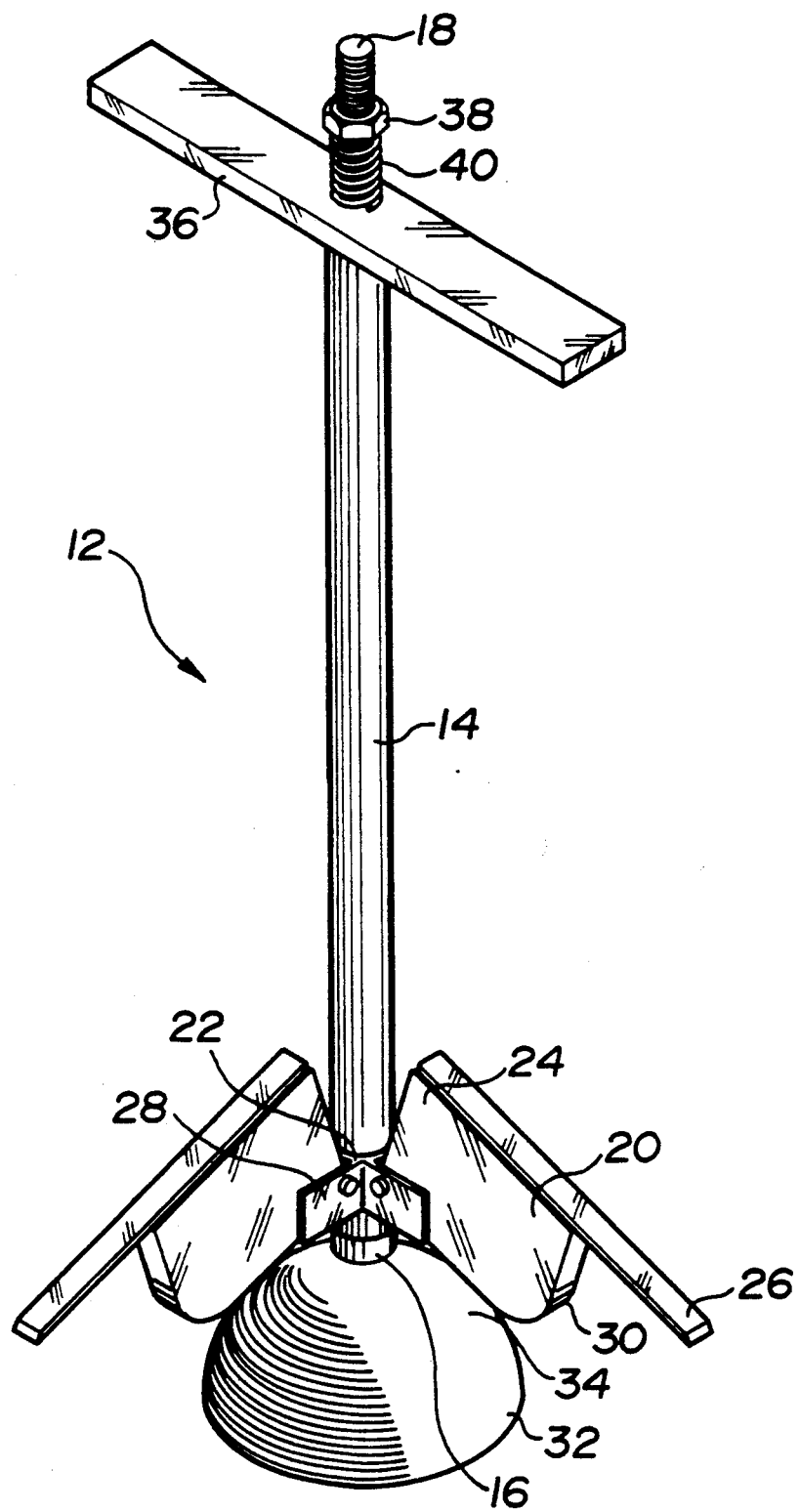
FIG. 5 is a perspective view of the ice reamer illustrated in FIG. 4, with blades in an extended position.

The present invention, a reamer, will now be described with reference to FIGS. 1 through 5. Two embodiments of the invention are illustrated. The first embodiment, generally identified by reference numeral 10, is illustrated in FIGS. 1 through 3. The second embodiment, generally identified by reference numeral 12, is illustrated in FIGS. 4 and 5.

Second embodiment 12 was developed first by the Applicant. This embodiment has an elongate tubular body 14 having a first end 16 and a second end 18. Three blades 20 are radially spaced around the pivotally secured to a slidable sleeve 22 at first end 16 of elongate body 14. Each of the blades 20 has a first end 24 and a second end 26. First end 24 of blades 20 are pivotally secured to sleeve 22 by brackets 28. Adjacent first end 24 each of the blades 20 has an interior cam surface 30. Secured to first end 16 of elongate body 14 is an inverted cup 32 having an arcuate contact surface 34. As sleeve 22 slides along elongate body 14 toward first end 16 interior cam surface 30 of each of blades 20 engages arcuate contact surface 34 of inverted cup 32 to move blades 20 into an extended position wherein each of blades 20 extend radially at an angle from elongate body 14 as illustrated in FIG. 5. As sleeve 22 moves toward the second end 18 of elongate body 16, blades 20 return to a retracted position with blades 20 drawn in toward elongate body 14 as illustrated in FIG. 4. A handle 36 is secured to sleeve 22 at second end 18 of elongate body 14. Blades 20 are moved between the extended position and the retracted position by a telescopic movement of sleeve 22 in relation to elongate body 14. This telescopic movement is effected by having second end 18 of elongate body 14 threaded. A nut 38 is threadedly secured to second end 18 of elongate body 14. A spring 40 provides a biasing force between nut 38 and sleeve 22. As nut 38 is tightened spring 40 provides a force against sleeve 22 to telescopically move sleeve 22 toward first end 16 of elongate body 14.

The use and operation of reamer 12 will now be described with reference to FIGS. 4 and 5. Referring to FIG. 4, elongate body 14 is inserted through a hole in the ice of a frozen lake with blades 20 in the retracted position. Once blades 20 are through the hole nut 38 is then tightened either by hand or through the use of tools to exert a force upon sleeve 22 until sleeve 22 telescopically moves toward first end 16 of elongate body 14. As sleeve 22 moves toward first end 16 of elongate body 14 interior cam surface 30 of each of blades 20 engages arcuate contact surface 34 of inverted cup 32 to move blades 20 into an extended position wherein each of blades 20 extend radially at an angle from elongate body 14 as illustrated in FIG. 5. Reamer 12 is then manually rotated by manipulation of handle 36 to ream a remote end of the hole through the ice with blade 20 in the extended position to remove the sharp circumferential ridges of ice at the bottom of the ice fishing hole.

Although the Applicant enjoyed great success with the embodiment just described two factors lead him to alter his embodiment. The first factor was the need to reduce the number of pieces of equipment he was carrying to remote frozen lakes. The second was the desire to adapt his invention for rotation through the use with a motor, rather than manual manipulation with a handle. Referring to FIG. 1, reamer 10 has an elongate tubular body 50 having a first end 52 and a second end 54. A single blade 56 is secured to first end 52 of elongate body 14. Blade 56 is telescopically received in a tubular sleeve 58 which is secured to and extends radially outwardly at an angle from elongate body 14. Blade 56 is movable between an extended position wherein the blade extends from tubular sleeve 58, and a retracted position wherein blade 56 is substantially retracted within sleeve 58. Second end 54 of elongate body 50 is adapted to be coupled with a motor of the type used for power ice augers. Illustrated in FIG. 1, is a hole 60 through which a locking pin (not shown) would be inserted to lock the motor elongate body 50. Reamer 10 used alternate means for moving blade 56 between the extended position and the retracted position. Referring to FIG. 2, it can be seen that blade 56 is biased by spring 62 which urge blade 56 into the extended position. A cable 64 having a first end 66 and a second end 68 is provided. First end 66 is secured to blade 56. Referring to FIG. 3, cable 64 extends up through elongate body 50 with second end 68 of cable 64 being secured to a lever 70 pivotally secured by bracket 72 to second end 54 of elongate body 50. Lever 70 has a cammed interior surface (not shown) which enables lever 70 to stay in a preselected position. The movement of lever 70 exerts a force upon cable 64 thereby drawing blade 56 into a retracted position. Pulleys 74 are positioned within interior 76 a each of ends 52 and 54 of elongate body 50 to facilitate movement of cable 64. Elongate body 50 has a spiral cutting edge 78.

The use and operation of reamer 10 will now be described with reference to FIGS. 1 through 3. With lever 70 moved to a position where blade 56 is retracted within tubular sleeve 58 elongate body 50 functions as an ice auger. Second end 54 of elongate body 50 is secured to a motor, and spiral cutting edge 78 is used to create a hole int he ice of a frozen lake. Once a hole has been created lever 70 is moved to a position in which the tension on cable 64 is released such that cable 64 is no longer drawing blade 56 into a retracted position. The biasing force of spring 62 then forces blade 56 into an extended position. The motor is then used to rotate elongate body 50 with blade 56 in an extended position thereby reaming a remote end of the hole through the ice. Lever 70 is then used to exert a force upon cable 64 until blade 56 is drawn back into a retracted position thereby permitting elongate body 50 to be removed from the ice fishing hole.

It will be apparent to one skilled in the art that modifications may be made to the embodiments illustrated without departing from the spirit and scope of the invention as defined by the claims.

The embodiments of the invention in which an exclusive property or privilege is claimed are defined as follows:

1. An ice reamer, comprising:
   a. an elongate tubular body having a first end, a second end, and a spiral cutting edge which extends between the first end and the second end such that the elongate body functions as an auger;
   b. a tubular sleeve secured to the first end of the elongate body and extending outwardly at an angle from the elongate body for a distance which is less than the width of the spiral cutting edge;
   c. a single blade disposed within the tubular sleeve, the blade being movable between an extended position wherein the blade extends radially at an angle from the tubular sleeve and a retracted position wherein the blade is drawn within the tubular sleeve;
   d. means at the second end of the elongate body, whereby the elongate body may be inserted through a hole with the blade in the retracted position and then rotated to ream a remote end of the hole with the blade in the extended position;
   e. biasing means biasing the blade toward an extended position; and
   f. a cable extending through the elongate tubular body and secured between the blade and a lever at the second end of the elongate body such that by manipulation of the lever a force is exerted upon the blade to overcome the biasing of the biasing means thereby moving the blade from the extended position to the retracted position.

2. The reamer as defined in claim 1, the elongate body having a spiral cutting edge such that the elongate body functions as an auger.

* * * * *